United States Patent [19]
Nahr

[11] 3,865,914
[45] Feb. 11, 1975

[54] METHOD OF MAKING A COMPOSITE BODY CONSISTING OF AT LEAST TWO COMPONENT PARTS SUCH AS PROFILES

[76] Inventor: Helmar Nahr, 54 Nurnberger Strasse, 8530 Neustadt-Aisch, Germany

[22] Filed: Nov. 30, 1973

[21] Appl. No.: 420,685

Related U.S. Application Data

[62] Division of Ser. No. 148,437, June 1, 1971, abandoned.

[52] U.S. Cl. ........ 264/46.5 D, 149/DIG. 1, 264/229, 264/261, 264/263
[51] Int. Cl. .............................................. E04c 3/27
[58] Field of Search ............. 52/309, 731, 743, 744; 49/DIG. 1; 264/45, 229, 261, 263; 29/458

[56] References Cited
UNITED STATES PATENTS

| | | | |
|---|---|---|---|
| 3,156,332 | 11/1964 | Cameron | 52/731 |
| 3,393,487 | 7/1968 | Nolan | 52/743 |
| 3,517,472 | 6/1970 | Toth | 52/309 |
| 3,583,118 | 6/1971 | Lowery | 52/309 |
| 3,798,869 | 3/1974 | Nipp | 49/DIG. 1 |
| 3,810,337 | 5/1974 | Pollard | 52/731 |

FOREIGN PATENTS OR APPLICATIONS

| | | | |
|---|---|---|---|
| 656,702 | 1/1965 | Belgium | 52/731 |
| 1,659,428 | 1/1971 | Germany | 49/DIG. 1 |

*Primary Examiner*—Ernest R. Purser
*Assistant Examiner*—Henry Raduazo
*Attorney, Agent, or Firm*—Hofgren, Wegner, Allen, Stellman & McCord

[57] ABSTRACT

A window or door frame assembly having formed elements, extrusions, profiles or the like held together by joining insulating pieces interfitting and connecting the formed elements, the whole assembly containing a foamed filling compound serving functions of insulating, stiffening, holding, expanding and tensioning of the connecting means simultaneously.

3 Claims, 9 Drawing Figures

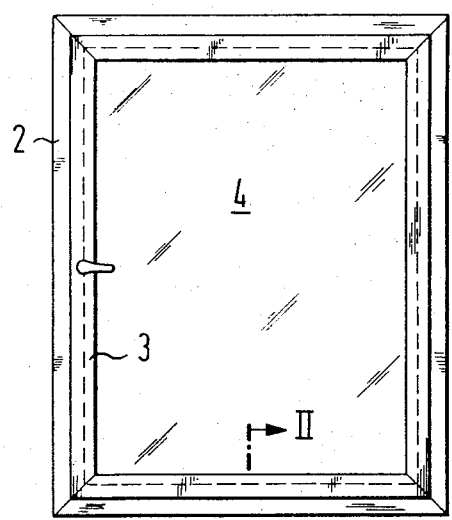
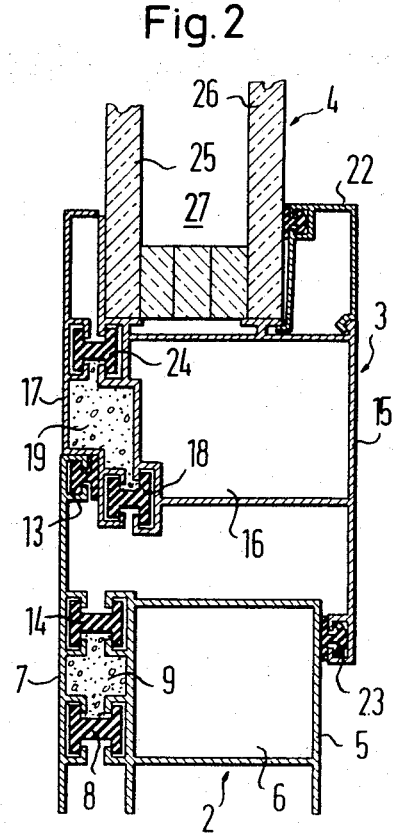
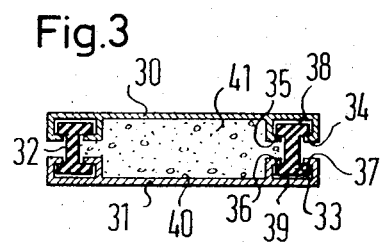
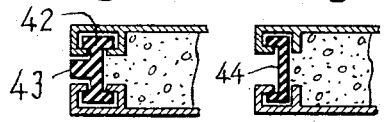
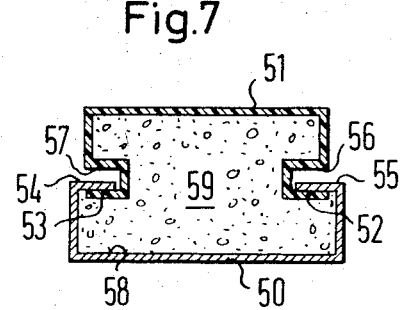

METHOD OF MAKING A COMPOSITE BODY CONSISTING OF AT LEAST TWO COMPONENT PARTS SUCH AS PROFILES

This is a division of application Ser. No. 148,437 filed June 1, 1971 now abandon.

BACKGROUND OF THE PRESENT INVENTION

The present invention relates to an element assembled from at least two partial elements, for example from profiles, wherein the partial elements enclose a wholly or partially closed cavity, comprising a joint preventing the folding apart of the partial elements and a filler compound filling the cavity.

A body of this kind is known from U.S. Pat. No. 3,156,332, for example in the form of a wing structure for a window. The wing structure is assembled from two channel-shaped metal profiles. The two legs of the channel-shaped metal profiles are provided with shoulders or undercuts and are interconnected by a hard insulating profile engaging behind the undercuts. The insulating profile has the object of preventing the transfer of heat between the two metal profiles. In order to improve the thermal insulation further, the cavity formed by the two metal profiles is filled with a foamed compound. Apart from the thermal insulation, the filler compound has no further function.

The above-mentioned U.S. patent stresses expressly that the insulating profiles may be easily inserted between the metal profiles and withdrawn therefrom (column 4, lines 36 to 38 of the U.S. patent). Obviously, a relative displacement of the assembled metal profiles is to be prevented only by assembling the corresponding parts of the window wing structure during the final assembly under formation of 90° corners. However, such a solution is unsatisfactory. On the one hand, the metal profiles, which are not fixed relative to each other, tend to rattle, and on the other hand the assembly of the individual legs of the wing is more expensive and time wasting if the metal profiles have shifted, either prior to the assembly of the window wing, for example during the storing or transportation or if they shift during the assembly.

For this reason, other systems have been developed for fixing metal profiles against displacement after the assembly.

It is known, for example, from German Pat. No. 1,066,343 to roll an insulating profile of plastic firmly between two metal profiles. However, this has the drawback that the configuration of the profile is considerably limited, in particular with regard to the maximum permissible width of profile, because the insulating profile must be rolled in from both sides and there is no possibility of arranging several insulating profiles side by side.

It is also known to fill the cavity between two metal profiles with cast, liquid, subsequently solidifying synthetic resin. This has the disadvantage of requiring expensive calibrated molds, which makes the fabrication expensive.

Finally, it is also known from German Pat. No. 1,247,759, to fill the cavity between two metal profiles with hard foam. This type of manufacture has the drawback that either also expensive molds are required, or else a closed, pressure-tight cavity which can, however, be filled with foam only with great difficulties in view of the unfavorable ratio between cross-section and length. In addition, there is the risk that the hard foam softens at high temperatures, so that the joint between the two metal profiles, formed only by the foam, does not exhibit the necessary temperature stability. In order to overcome this defect, auxiliary construction, for example securing pins, are used which have, in turn, the disadvantage of bridging the thermal insulation.

The present invention may, therefore, provide an element of the kind hereinbefore described in which the partial elements, for example the profiles, are fixed relative to each other, while the disadvantages of the known solutions are avoided. In addition, the shape of the body according to the invention, for example of the profiles, should be variable within wide limits.

According to the present invention the partial elements are pushed apart by the filler compound to such an extend that the connection is stressed in tension, thereby fixing the partial elements also against displacement.

The disclosure of the invention applies generally to a body assembled from at least two partial elements. It is based on the combination of a tension joint, preventing the moving apart of the partial elements, e.g. by stops, and a filler compound tending to push the partial elements apart.

The disclosure according to the invention applies more particularly also to bodies, the partial elements of which are formed by metal profiles for windows, doors and the like. In this case, the connecting elements for producing the tension joint may be formed by profiled connecting rails, having for example a double T profile, a double T profile with lug, a U profile, a U profile with lug, or a similar profile, and which are fitted into undercut grooves of the metal profile. The profiled connecting rails are preferably so dimensioned that they engage with clearance into the undercut grooves and may be easily pushed into the grooves. This clearance facilitates the assembly similarly to that of the wing structure according to U.S. Pat. No. 3,156,332. However, the disadvantage of the possibility of a displacement of the metal profiles after the assembly is here eliminated because the filler compound pushes the metal profiles, in accordance with the disclosure of the invention, apart to such an extend that the double T profiles are stressed in tension and the corresponding parts of the double T profiles and of the metal profiles rest firmly on each other under friction. The clearance has not only the advantage of facilitating the assembly, but it also makes possible the escape of air from the cavity during the expansion of the filler compound. However, the filler compound cannot escape through the gaps formed by the clearance because during the increase in volume, the filler compound enters into the gaps and sets there.

The profiled connecting rails may be made, for example, of a thermally insulating, rigid material, preferably hard plastic, while the filler compound may be foam mixture the volume of which increases after penetration into the cavity under the application of heat or other activation.

The advantages of the invention are demonstrated particularly clearly in the special case in which the partial elements are metal profiles, e.g. for windows, doors or the like, which are interconnected by profiled connecting rails and held apart by hard foam applied into the cavity: mechanically the advantage is that the metal profiles are combined to form an absolutely rigid body, e.g. a leg for a window wing. The thermal advantage is that the major part of the cross-section of the body is formed by hard foam which is an excellent insulator, while the connecting rails which are less effective insulators have only a very small cross-section compared with the hard foam.

Apart from the above, it is not necessary for the partial bodies to be interconnected by engaging projecting edges, undercuts, T-shaped webs or the like. It is, for example, also possible to provide elastic connecting parts on at least one partial element which co-operate with corresponding parts on at least one other partial body, so that a joint, preventing the folding apart of the partial bodies, is made by snap engaging the said connecting parts. The filler compound acts also here in accordance with the disclosure of the invention.

The invention also relates to a method for fabricating a body of the kind hereinbefore described from two partial elements and a foaming filler compound, wherein the partial elements are interconnected by a tension joint preventing them from folding apart.

The method according to the invention is characterized in that at least one of the partial bodies receives on its side defining the cavity the foaming filler compound, and in that the tension joint is made simultaneously with or after this application, but before or during the increase of the volume of the filler compound.

The method according to the invention offers special advantages if the partial elements are formed from oblong profiles which are displaced relative to each other longitudinally to form the tension joint, wherein they either directly engage by means of edges, undercuts or the like or make engagement with suitably profiled connecting elements. In this case, at least one of the profiles may pass below a pouring head for receiving the filler compound during the same operation. The longitudinal joint between the profiles is closed tightly after the increase of the volume of the filler compound.

BRIEF DESCRIPTION OF THE DRAWINGS

The invention will be further described, by way of example, with reference to the accompanying drawings, showing embodiments thereof, and in which:

FIG. 1 shows a window produced by means of the invention;

FIG. 2 is a cross-section along the line II—II through a wing and frame leg of FIG. 1;

FIG. 3 is a cross-section of two partial elements connected by the method in accordance with the invention;

FIGS. 4, 5 and 6 are partial cross-sections through partial elements connected in accordance with the invention and having differently constructed profiled rails;

FIG. 7 is a cross-section through two other partial elements connected in accordance with the invention;

FIG. 8 is a side elevation of a device operating in accordance with the fabricating method according to the invention and serving particularly for connecting profiled metal rails for windows, doors and the like.

BRIEF DESCRIPTION OF THE PREFERRED EMBODIMENTS

Figure 8:
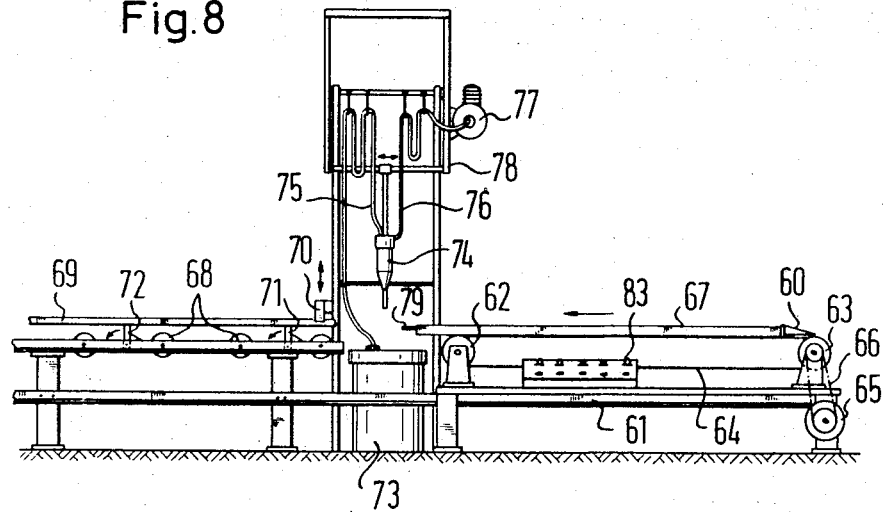

The principle of the invention will further be explained with reference to FIG. 3. The two partial elements are formed by two profiled metal rails 30, 31. Each of the two rails 30, 31 is provided with two undercut grooves. Profiled connecting rails 32, 33 made of hard plastic or hard rubber engage into the two undercut grooves. The two connecting profiles have a double T cross-section. The connecting profiles 32, 33 and the undercut grooves in the profiled metal rails 30, 31 are so dimensioned that the profiled metal rails engage with clearance into the undercut grooves. The cavity 40 enclosed by the two profiled metal rails 30, 31 is filled with hard foam 41. The hard foam has formed in this cavity from a liquid starting product under increase of volume, assuming the maximum possible volume in the cavity 40. That means that the two profiled metal rails 30, 31 have been pushed apart by the hard foam 41 to the extent permitted by the clearance. The two connecting profiles 32, 33 are, therefore, stressed in tension. Examining, for example, the connecting profile 33 it may be seen that it rests under the action of this tensile stress with its flanges on the undercuts 34, 35, 36, 37 of the correspondingly undercut grooves. At these points friction occurs which prevents the metal profiles 30, 31 from being displaced in the longitudinal direction. The metal profiles 30, 31 are also prevented from moving in other directions and form, therefore, a rigid body. The air gaps 38, 39 between the metal profiles and the connecting profiles show that the above mentioned dimensioning permits the metal profiles to be easily fitted into the grooves. The body formed from the two metal profiles 30, 31 is, for example, characterized in that the two metal profiles are extremely well insulated from each other against a transfer of heat. The major part of the cross-section is taken up by the hard foam 41 which is a very bad conductor of heat. The connecting profiles 32, 33 have a slightly less efficient thermal insulation, but their proportion of the total cross-section is very small.

FIGS. 4, 5 and 6 show three other possibilities for forming metal profiled rails and connecting profiles. The profile 42 of the connecting profile in FIG. 4 is a double T cross-section with lug 43. The connecting profile 44 in FIG. 5 is U-shaped profile and the connecting profile 45 in FIG. 6 is a U-shaped profile with lug 46. Many other possible profiles are conceivable for use in this manner.

FIG. 7 shows how a profiled plastic rail 51 may be combined with a profiled metal rail 50 to form a solid body. The material of the profiled plastic rail 51 is elastic. The profiled plastic rail 51 has two undercut grooves 56, 57 which engage into two flanges 54, 55 of the profiled metal rail 50. The cavity 58, formed by the profiled plastic rail 51 and the profiled metal rail 50, is again filled with hard foam 59 which pushes the profiled plastic rail 51 and the profiled metal rail 50 apart to such an extent that the flanges 54, 55 rest tightly on the undercuts 52, 53 of the undercut grooves 56, 57. The resulting friction prevents the displacement of the profiled plastic rail 51 relative to the profiled metal rail 50. The assembly between the profiled plastic rail 51 and the profiled metal rail 50 may either be effected by pushing the flanges 54, 55 into the substantially larger grooves 56, 57. However, it is also possible to bend the legs of the profiled plastic rail 51, so that a snap fit is formed over the whole length. The members 50, 51 shown in FIG. 7 need not be profiled rails, but could also be disc-shaped elements with which the same connecting mechanism can be used.

The invention finds a very practical application for example for the fabrication of a metal window of the kind shown in FIG. 1. The metal window consists of a stationary frame 2 and a movable wing 3. The wing 3 contains the window pane 4. In such metal windows it is a known object to prevent the transfer of heat between the inside and the outside. FIG. 2 shows how this may be achieved. The frame leg 2, shown in cross-section, consists of two profiled metal rails 5, 7. The metal rail 5 encloses a cavity 6 filled with air and serving as a mounting (support for corner angle). The two profiled metal rails 5 and 7 are connected by two profiled connecting rails 8 and 14 after the manner shown in FIG. 3. The cavity between the two profiled metal rails 5 and 7 is filled with hard foam 9. In this manner, the profiled metal rail 5 on the inside of the window is thermally insulated against the profiled metal rail 7 of the outside of the window. The corresponding wing leg consists of a profiled metal rail 15 on the inside of the window and a profiled metal rail 17 on the outside of the window. The profiled metal rail 15 forms a cavity 16 which is filled with air and serves as heat insulation. The two profiled metal rails 15 and 17 are connected by two profiled connecting rails 18 and 24. The cavity between the two profiled metal rails 15 and 17 is again filled with hard foam 19. A further profiled metal rail 22 is clamped to the profiled metal rail 15 and serves for mounting the window pane 4. The pane 4 consists of two insulating glass panes 25 and 26 which form a cavity between themselves. In order to provide a tight joint between the wing 3 and the frame 2, rubber profiles 13, 23 are provided at the joints and are mounted, respectively, on the frame and on the wing.

It is essential for the invention that the legs of the wing 2 and of the frame 3 consist each of rigidly interconnected profiled metal rails which are well thermally insulated against each other. The rigid connection is of the utmost importance for a rational and simple assembly of the four legs to form a wing or a frame.

Figure 9:
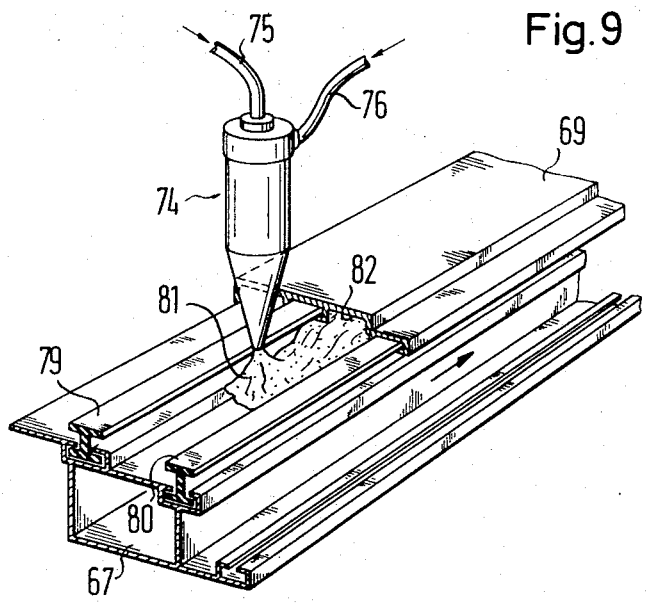
FIG. 9 is an enlarged perspective view of the pouring head and the two profiled metal rails in FIG. 8.

FIG. 9 shows how two profiled metal rails 67, 69 may be effectively combined to form a rigid body. The metal rail 69 is firmly held in its place. The profiled connecting rails 79, 80 are already engaged into correspondingly undercut grooves of the profiled metal rail 67. The fitting of the profiled connecting rails 79, 80 is particularly simple because, as already mentioned above, the connecting rails engage with clearance in the undercut grooves. The profiled metal rail 67 is now pushed in the direction of the arrow relative to the profiled metal rail 69, while the profiled connecting rails 79, 80 engage into the undercut grooves of the profiled metal rail 69. A viscous liquid 81 is delivered from a stationary pouring head 74 and flows on to the base of the profiled metal rail 67, defining the cavity 82. The liquid 81 is the starting compound for a hard foam which forms, subsequently during the passage of time, under application of heat or by other activation, in the cavity 82 enclosed by the two profiled metal rails 67 and 69. The hard foam pushes the two profiled metal rails 67 and 69 apart and seals the remaining gaps. The foam mixture is applied to the pouring head 74 through a connection 75 and compressed air through a connection 76.

FIG. 8 shows a device for carrying out the method according to the invention, such as shown in FIG. 9. The machine has a frame 61, on the right side of which is a conveyor belt 64. The conveyor belt 64 runs over two rollers 62, 63 of which the roller 63 is driven by a motor 65 via a belt 66. On the left side of the frame 61 is a roller track 68. In addition, the frame has a mounting 78 for a pouring head 74. The pouring head is adapted to be displaced in the mounting as indicated by the double headed arrow. The pouring head 74 communicates through a conduit 75 with a tank 73 containing the starting mixture for the foam. A conduit 76 connects the pouring head 74 with a compressor 77. The profiled metal rail 69 is mounted on two supports 71, 72, adapted to be tilted towards the left. It is clamped tight by clamping device 70 adapted to be displaced vertically in the direction of the double headed arrow. The profiled metal rail 67 rests on thhe conveyor and is moved by the conveyor belt towards the left in the direction of the arrow. The forward movement is achieved by an abutment 60 on the conveyor belt. When the profiled metal rail 67 impinges on the support 71, the latter tilts towards the left. The same happens with the support 72. After the tilting of the support 71, 72, the profiled metal rail 67 performs their supporting function. The device may be operated from a control desk 83.

The foregoing detailed description has been given for clearness of understanding only, and no unnecessary limitations should be understood therefrom, as some modifications may be obvious to those skilled in the art.

I claim:

1. A method of constructing a composite frame body member including a pair of profiled elongated shaped members faced toward each other to form a laterally open cavity between them and connecting members closing the laterally open cavity and loosely securing the profiled members from moving apart from each other, comprising:
   assembling one of the profiled members and the connecting members to extend at least equally in length,
   placing the other profiled member in longitudinal alignment with the connecting members to receive and connect with the latter upon endwise movement of the two profiled members,
   placing one of the profiled members in position to expose its interior upwardly,
   introducing an expandable foam filler compound into the interior of the profiled members having its interior exposed upwardly and moving the members relative to each other to assemble the profiled members and connecting members into assembled equal length, and expanding said foam filler to tension the connecting members laterally of the composite body member.

2. The method of claim 1 wherein the one profiled member with connecting members loosely assembled thereto is passed under a foam filler depositing spout to receive foam filler and simultaneously is assembled longitudinally with the other profiled rail to make the complete assembly prior to expansion of the foam filler to tension the connecting members.

3. The method of claim 1 wherein the connecting members are provided with flanges loosely interfitting with mating flanges on both profiled members for longitudinal sliding motion of the connecting members into the profiled members to close the cavity between the profiled members and said foam filler is expanded in the closed cavity to provide said tensioning the connecting members laterally of the length of the composite body member.

* * * * *